US009533367B2

(12) United States Patent
Carrier et al.

(10) Patent No.: US 9,533,367 B2
(45) Date of Patent: Jan. 3, 2017

(54) CORDLESS WELDING MACHINE AND PLASMA CUTTER

(75) Inventors: David A. Carrier, Aberdeen, MD (US); Geoffrey S. Howard, Columbia, MD (US); Shelby K. Starks, Baltimore, MD (US); David A. Goldman, Phoenix, MD (US)

(73) Assignee: Black & Decker Inc., New Britain, CT (US)

( * ) Notice: Subject to any disclaimer, the term of this patent is extended or adjusted under 35 U.S.C. 154(b) by 2641 days.

(21) Appl. No.: 11/742,108

(22) Filed: Apr. 30, 2007

(65) Prior Publication Data

US 2007/0257084 A1 Nov. 8, 2007

(51) Int. Cl.
*B23K 9/10* (2006.01)
*B23K 10/00* (2006.01)

(52) U.S. Cl.
CPC .............. *B23K 9/10* (2013.01); *B23K 9/1081* (2013.01); *B23K 10/003* (2013.01); *Y10T 29/53135* (2015.01)

(58) Field of Classification Search
CPC ....... B23K 10/003; B23K 9/10; B23K 9/1081; B23K 9/013; Y10T 29/53135
USPC ..................... 219/130.1, 108, 86.21, 121.34, 137 PS,219/121.36, 121.39, 70
See application file for complete search history.

(56) References Cited

U.S. PATENT DOCUMENTS

| | | | |
|---|---|---|---|
| 2,446,650 A * | 8/1948 | Hammers ................ | H05B 3/02 219/70 |
| 2,478,527 A * | 8/1949 | Dawson ................ | B23K 11/26 219/108 |
| 3,365,644 A | 1/1968 | Smallman | |
| 3,652,824 A | 3/1972 | Okada | |
| 3,659,183 A | 4/1972 | Carlson | |
| 3,805,143 A * | 4/1974 | Tauern ................... | B23K 11/26 219/113 |
| 3,838,786 A | 10/1974 | Bachmann et al. | |
| 4,182,949 A | 1/1980 | Powers et al. | |
| 4,187,411 A | 2/1980 | Bryce et al. | |
| 4,656,327 A * | 4/1987 | Wilcox ...................... | 219/86.21 |
| 4,665,300 A | 5/1987 | Bellefleur | |
| 4,764,656 A * | 8/1988 | Browning ................ | 219/121.44 |
| 4,866,247 A | 9/1989 | Park et al. | |
| 4,948,933 A * | 8/1990 | Thompson ............. | B23K 9/013 219/69.16 |
| 4,950,863 A * | 8/1990 | Gilliland ................ | B23K 9/013 219/130.1 |

(Continued)

FOREIGN PATENT DOCUMENTS

| | | | |
|---|---|---|---|
| CH | 603317 | A * | 8/1978 |
| DE | 10313687 | | 11/2003 |

(Continued)

OTHER PUBLICATIONS

"Genesis PURELEAD, Application Manual", sixth edition, Jun. 2005, Publication No. US-GPL-AM-002,pp. 1-28.*

(Continued)

*Primary Examiner* — Geoffrey S Evans

(74) *Attorney, Agent, or Firm* — Adan Ayala

(57) ABSTRACT

A cordless welding machine includes first and second batteries being connected in parallel, a ground clamp connected to the first and second batteries, and a first welding electrode connected to the first and second batteries. The batteries providing a current output of at least about 40 amps.

34 Claims, 5 Drawing Sheets

(56) References Cited

U.S. PATENT DOCUMENTS

| | | | |
|---|---|---|---|
| 5,041,710 A * | 8/1991 | Hamal | B23K 9/013 219/70 |
| 5,086,205 A * | 2/1992 | Thommes | 219/121.54 |
| 5,086,208 A | 2/1992 | Habermann | |
| 5,148,001 A | 9/1992 | Stava | |
| 5,208,436 A * | 5/1993 | Blankenship | 219/121.54 |
| 5,233,159 A * | 8/1993 | Day | B23K 9/1006 219/130.1 |
| 5,250,786 A | 10/1993 | Kikuchi et al. | |
| 5,410,126 A | 4/1995 | Miller et al. | |
| 5,428,267 A * | 6/1995 | Peil | 315/224 |
| 5,548,097 A * | 8/1996 | Couch et al. | 219/121.57 |
| 5,549,097 A * | 8/1996 | Nimberger | 123/690 |
| 5,643,479 A | 7/1997 | Lloyd et al. | |
| 5,757,162 A * | 5/1998 | Weber | 318/821 |
| 5,961,863 A | 10/1999 | Stava | |
| 5,993,983 A * | 11/1999 | Rozon | 429/9 |
| 6,111,215 A | 8/2000 | Lilly | |
| 6,150,632 A | 11/2000 | Fisher | |
| 6,225,596 B1 | 5/2001 | Chandler et al. | |
| 6,313,449 B1 | 11/2001 | Smith et al. | |
| 6,562,509 B1 * | 5/2003 | Eggert | 429/96 |
| 6,747,246 B2 * | 6/2004 | Crandell, III | 219/130.1 |
| 6,777,649 B2 | 8/2004 | Reynolds et al. | |
| 6,818,860 B1 | 11/2004 | Stava et al. | |
| 6,825,435 B1 | 11/2004 | Brown | |
| 6,977,358 B2 | 12/2005 | Albrecht et al. | |
| 7,183,517 B2 | 2/2007 | Albrecht et al. | |
| 7,288,740 B2 * | 10/2007 | Radtke | 219/130.1 |
| 2003/0013007 A1 * | 1/2003 | Kaun | 429/94 |
| 2003/0090162 A1 * | 5/2003 | Cornog et al. | 307/150 |
| 2003/0164357 A1 * | 9/2003 | Hedberg | 219/98 |
| 2004/0196002 A1 * | 10/2004 | Watson et al. | 320/114 |
| 2004/0226930 A1 * | 11/2004 | Radtke | 219/130.1 |
| 2004/0229499 A1 * | 11/2004 | Cottle | 439/504 |
| 2005/0061791 A1 * | 3/2005 | Matus | B23K 9/1006 219/130.21 |
| 2005/0073282 A1 * | 4/2005 | Carrier | B25F 5/00 320/106 |
| 2005/0109748 A1 * | 5/2005 | Albrecht | B23K 9/1056 219/130.1 |
| 2006/0037945 A1 * | 2/2006 | Schneider | 219/121.4 |
| 2006/0037953 A1 | 2/2006 | Matthews et al. | |
| 2006/0096771 A1 * | 5/2006 | Brotto | 173/217 |
| 2006/0292444 A1 * | 12/2006 | Chiang et al. | 429/218.1 |
| 2007/0096690 A1 * | 5/2007 | Casalena et al. | 320/112 |
| 2007/0181547 A1 * | 8/2007 | Vogel | B23K 9/1081 219/130.1 |
| 2007/0187376 A1 | 8/2007 | Albrecht et al. | |
| 2007/0235422 A1 * | 10/2007 | Bornemann | 219/121.39 |
| 2007/0235428 A1 * | 10/2007 | Schneider | B23K 9/013 219/121.54 |
| 2007/0251931 A1 * | 11/2007 | Lambirth et al. | 219/130.1 |
| 2008/0053967 A1 * | 3/2008 | Moore | 219/98 |

FOREIGN PATENT DOCUMENTS

| | | |
|---|---|---|
| GB | 1 379 442 | 1/1975 |
| GB | 2316244 A | 2/1998 |
| JP | 52-42443 A | 4/1977 |
| JP | 54-53652 A | 4/1979 |
| JP | 56-77068 | 6/1981 |
| JP | -57-16877 A * | 10/1982 |
| JP | 61-135479 | 6/1986 |
| JP | 04-135070 | 5/1992 |
| JP | 04-356372 | 12/1992 |
| JP | 05-15641 | 2/1993 |
| JP | 05-023849 | 2/1993 |
| JP | 05-023852 | 2/1993 |
| JP | 05-95146 | 12/1993 |
| JP | 06-182548 | 7/1994 |
| JP | 06-297145 | 10/1994 |
| JP | 07-314140 | 12/1995 |
| JP | 09-155562 | 6/1997 |
| JP | -10-272563 A * | 10/1998 |
| JP | 2001-259837 | 9/2001 |
| JP | 2002-001545 | 1/2002 |
| JP | 2002-066737 | 3/2002 |
| JP | 2003-136240 | 5/2003 |
| JP | 2005-034903 | 2/2005 |
| SU | 725833 A * | 4/1980 |

OTHER PUBLICATIONS

Bhardwaj et al., "Lead Acid with thin metal film (TMF) technology for high power applications", Dec. 2000, Journal of Power Sources, vol. 91, pp. 51-61.*

Gruenstein et al., "Inspira—an enabling battery technology for high voltage automotive electrical systems" Dec. 2000, Journal of Power Sources, vol. 91, pp. 62-67.*

Glen R., article "Broco Inc.'s GOWELDO: Portable Mig Welder" Jul. 2003, on website www.off-road.com/trucks, pp. 1-3.*

Suzuki et al., "High Power and Long Life Lithium-ion Battery for Backup Power Sources", Oct. 2003, Telecommunications Energy Conferences, IEICE/IEEE INTELEC '03, pp. 317-322.*

Adam Piekarski, European Search Report, Jun. 5, 2008, The Hague. Annex to the European Search Report on European Patent Application No. EP 07 10 7403.

* cited by examiner

CORDLESS WELDING MACHINE AND PLASMA CUTTER

This application derives priority from U.S. Provisional Patent Application Nos. 60/797,798, filed May 4, 2006, and 60/821,606, filed Aug. 7, 2006.

FIELD

This specification relates to welding machines and more specifically to cordless welding machines.

Welding machines, or welders, are well known in the prior art.

For example, stick (SMAW) welders melt and join metals by heating them with an arc, between a covered metal electrode and the workpiece. Shielding gas is obtained from the electrode outer coating, often called flux. Filler metal is obtained from the electrode core.

Other welders include the MIG (GMAW) welder, which joins metals by heating them with an arc. The arc is between a continuously fed filler metal (consumable electrode) and the workpiece. Externally supplied gas or gas mixtures provide shielding. Certain flux cored wires (consumable electrode) can be used without external shielding gas.

Typically these welders are connected to AC generators or the AC residential power lines. However, such welders are difficult to move to different places, especially if no nearby source of AC power exists. Furthermore, the typical weight of the machine (without cables, spool and spool gun) is above 45-60 pounds. Typically, the output current of such units at 20% duty cycle is between 1.5 and 1.8 Amps per pound. On, If the batteries are not on board, for example, the unit runs off of automotive batteries (Pb-acid), the user would have to carry an additional heavy component along with the welder.

It is an object to provide a lightweight welding machine.

SUMMARY

A cordless welding machine including first and second batteries being connected in parallel, a ground clamp connected to the first and second batteries, and a first welding electrode connected to the first and second batteries, the batteries providing a current output of at least about 40 amps.

Additional features and benefits of the present invention are described, and will be apparent from, the accompanying drawings and the detailed description below.

BRIEF DESCRIPTION OF THE FIGURES

The accompanying drawings illustrate preferred embodiments according to the practical application of the principles thereof, and in which:

FIG. 7 is a schematic diagram of a cordless MIG welding machine according to the invention, where

DETAILED DESCRIPTION

The present invention will now be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
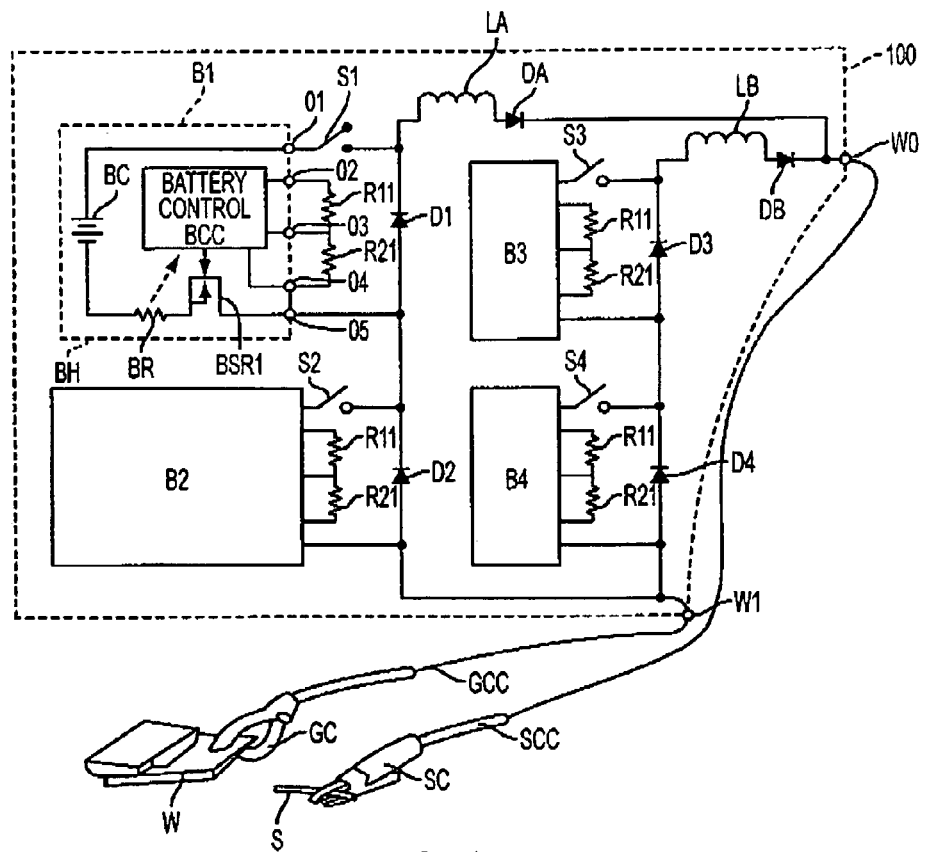
FIG. 1 is a schematic diagram of a cordless stick welding machine according to the invention.
Figure 2:
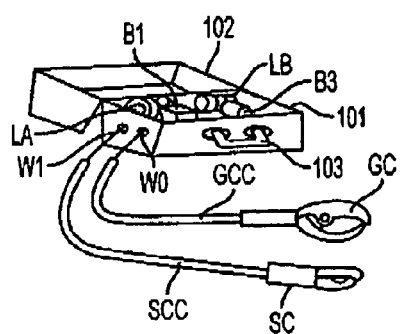
FIG. 2 is a perspective view of a first embodiment of the cordless stick welding machine of FIG. 1.
Figure 3:
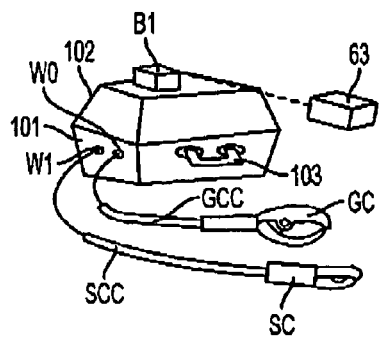
FIG. 3 is a perspective view of a second embodiment of the cordless stick welding machine of FIG. 1.

In FIGS. 1-3, an exemplary cordless stick welding machine according to the present invention is designated generally by the reference numeral 100. The welding machine 100 preferably includes a housing 101. A lid housing 102 may be pivotally attached to housing 101. A handle 103 may be attached to the housing 101 and/or the lid housing 102.

Figure 6:
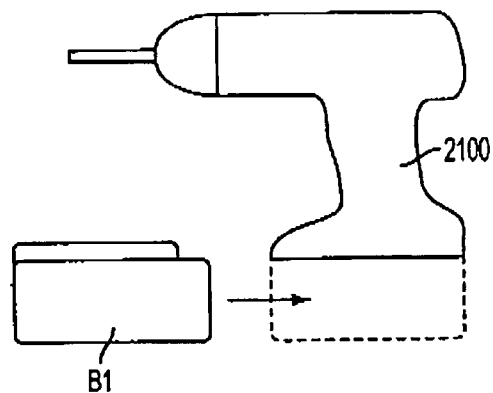
FIG. 6 is a side view of a power tool engageable with a battery pack usable with a cordless welding machine.

Welding machine 100 may have at least two battery packs for power. Preferably, the battery packs can be engaged with power tools 2100 as shown in FIG. 6. Each battery pack preferably has the same components. Accordingly, the discussion as to battery pack B1 may apply to battery packs B2, B3, B4 as well.

Referring to FIG. 1, battery pack B1 has a housing BH, at least one cell BC disposed in housing BH. Cell(s) BC may have a lithium ion chemistry, such as lithium phosphate, lithium manganese, etc. For example, one possible chemistry could be the chemistry disclosed in US Published Application No. 2005/0272214, which is fully hereby incorporated by reference herein.

Preferably, cells BC can output a total voltage of at least about 25 volts and preferably about 36 volts, and a current of about 40 amps.

Cell(s) BC may be disposed two outputs O1, O5. A switching semiconductor BSR and a current sensor or resistor BR may be disposed between output O5 and cell(s) BC. A battery control BCC may receive information from the current sensor BR to control the switching semiconductor BSR.

Battery control BCC may also receive other inputs via outputs O2, O3, O4. Preferably, welding machine 100 has a resistor R11 disposed between outputs O2, O3 and a resistor R21 disposed between outputs O3, O4. The values of resistors R11, R21, as read by battery control BCC, are preferably used by battery control BCC to access the correct pre-programmed settings for proper operation of switching semiconductor BSR.

Persons skilled in the art are referred to US Published Application Nos. 2005/0073282 and 2005/0077878, which are fully incorporated herein by reference, for further information on the components, operation and capabilities of battery pack B1.

Outputs O1, O5 may be connected to a diode D1 and a switch S1 to activate the Battery Control BCC. As shown in FIG. 1, a second battery B2 and a diode D2 may be connected in parallel. Such parallel combination may be connected in series to the parallel combination of battery B1 and diode D1. Second battery B2 may be controlled via a switch S2, which is preferably physically connected to switch S1. Accordingly, a user can close both switches S1, S2 at the same time. The switch is intended to activate the separate Battery Control BCC units and not the main welding current.

An inductor LA may be disposed downstream of the parallel combination of battery B1 and diode D1. Inductor LA may be rated between 50 microhenries to 5 H. A diode DA may be disposed downstream of inductor LA.

As seen in FIG. 1, a third battery B3 and a diode D3 may be connected in parallel. Such parallel combination may be connected in series to the parallel combination of a fourth battery B4 and diode D4.

Batteries B3, B4 may be controlled via switches S3, S4, respectively, which are preferably physically connected to switch S1. Accordingly, a user can close switches S1, S2, S3, S4 at the same time via one throw.

An inductor LB may be disposed downstream of the parallel combination of battery B3 and diode D3. A diode DB may be disposed downstream of inductor LB. The output of inductor LA and/or diode DA connects with the output of inductor LB and/or diode DB. The combined output is connected to an electrode jack W0.

Furthermore, diodes D2, D4 (or if only two battery packs are used, diodes D1, D3) are also connected, which in turn are connected to an electrode jack W1.

Referring to FIGS. 1-3, a ground clamp GC can be connected to electrode jack W1 via a cable GCC. Persons skilled in the art will recognize that ground clamp GC will preferably be attached to workpiece W.

Similarly, a stick clamp SC (electrode holder) can be connected to electrode jack W0 via a cable SCC. Persons skilled in the art will recognize that an electrode stick S can be held by stick clamp SC. As is well know, when stick S contacts workpiece W, the current sent by welding machine 100 through stick S will cause stick S to melt, thus welding workpiece W.

Persons skilled in the art will recognize that, in the four-battery configuration shown in FIG. 1, the voltage output will be about 72V and a current output of about 80 amps. In a two-battery configuration (i.e., only battery packs B1, B3 are used), the voltage output will be about 36V and a current output of about 80 amps.

Preferably, all the components of welding machine 100 are disposed during operation within housings 101 and/or 102, as shown in FIG. 2. Alternatively, battery packs B1, B3 may be disposed on lid housing 102, as shown in FIG. 3. The battery packs can be removably connected to receptacles (disposed inside housing 101, on top of housing 102, etc.) as explained in U.S. Pat. No. 6,057,608, which is fully incorporated herein by reference.

Persons skilled in the an will recognize that housings 101 and/or 102 can be designed so that cables GCC, SCC and clamps GC, SC can be stored in housings 101 and/or 102, allowing the user to carry the entire welding machine 100 via handle 103. Cord wraps may also be employed to allow external wrapping of welding cables.

With such construction (and the high power-to-weight ratio provided by lithium cell chemistries and/or other chemistries), the total weight of welding machine 100, excluding cables GCC, SCC and clamps GC, SC, would be between about 8 pounds to about 23 pounds in the two battery pack configuration. In a four battery pack configuration, the total weight of welding machine 100, excluding cables GCC, SCC and clamps CC, SC, would be between about 12.8 pounds to about 29 pounds.

Figure 4:
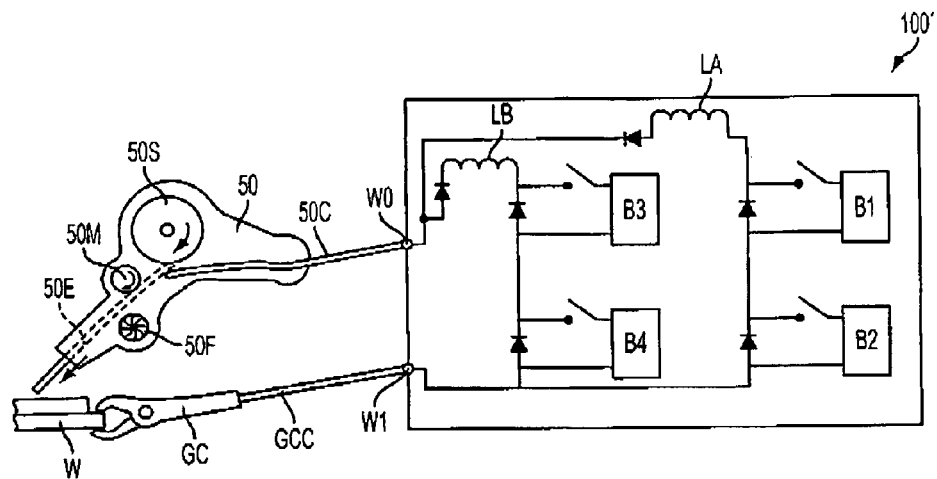
FIG. 4 is a schematic diagram and partial cross-sectional view of a cordless MIG welding machine according to the invention.

FIG. 4 illustrates a MIG welding machine 100'. Preferably, such machine has the same construction as the stick welding machine 100 described above (and where like numerals refer to like parts), except for one major difference: the welding gun 50. Gun 50 may have a wire spool 50S carrying a flexible electrode 50E, or a channel (not shown) for receiving and exiting such electrode 50E.

Flexible electrode 50E may be moved out of gun 50 via a motor 50M, which may be disposed on or off gun 50. Persons skilled in the art will recognize that a cable (not shown) may be disposed between welding machine 100' and motor 50M, to power such motor 50M. Persons skilled in the art will recognize that a motor power supply (not shown) may be used to vary the speed of motor 50M (and thus of the exiting electrode 50E).

Electrode 50E is ultimately connected to electrode jack W0 via cable 50C.

Accordingly, electricity passes between electrode 50E and workpiece W, the tip of electrode 50E will melt, welding workpiece W.

Preferably, electrode 50E has a flux core, allowing flux released from electrode 50E to cover the weld and prevent oxidation. Gun 50 may have a fan 50F to spread such gas. Alternatively, gun 50 may receive gas or compressed air from a tank (not shown) disposed off the gun 50.

Persons skilled in the art will recognize that further controls can be provided to change the output properties of the MIG welding machine 100'. For example, a control can be provided to select the specific current or voltage output of MIG welding machine 100'. This could be achieved by changing the value of resistors R11 and/or R21, thus informing the battery packs that a new current has been selected. The battery controls BCC would then control the semiconductor switches BSR accordingly.

As before, it is preferable that the entire MIG welding machine 100' be storable into housings 101 and/or 102. The total weight of welding machine 100, excluding cables GCC, 50C, clamp GC, and gun 50, is preferably between about 8 pounds to about 23 pounds in the two battery pack configuration. In a four battery pack configuration, the total weight of welding machine 100, excluding cables GCC, 50C, clamp GC, and gun 50, may be between about 12.8 pounds to about 29 pounds.

Figure 5:
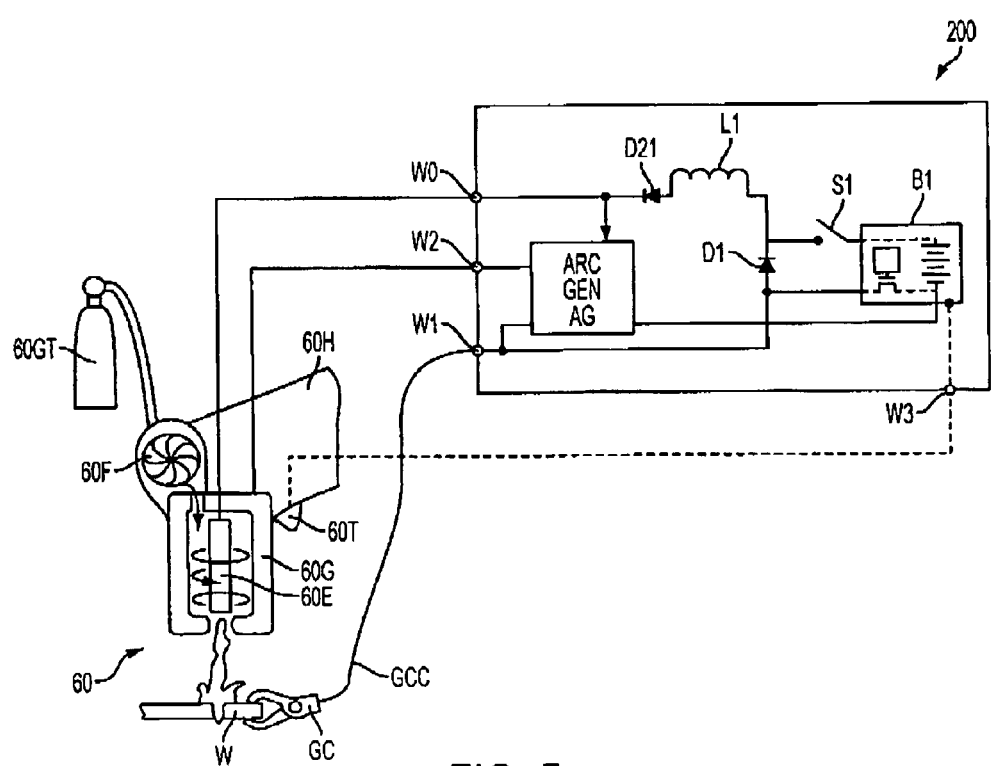
FIG. 5 is a schematic diagram and partial cross-sectional view of a cordless plasma cutter according to the invention.

FIG. 5 illustrates a plasma cutting machine 200, where like parts refer to like numerals. All the teachings of the welding machines shown in FIGS. 1-4 and describe above are incorporated herein by reference. As before, battery pack B1 is connected to diode D1 in parallel, with switch S1 in between battery pack B1 and diode D1.

The output of the battery pack may be connected to electrode Jacks W0, W1. An inductor L1 may be disposed between electrode jack W0 and diode D1. A diode D21 may be disposed between electrode jack W0 and inductor L1.

The output of inductor L1 and/or diode D21 may be also connected to a high voltage arc generator AG. Arc generator AG may also be connected to electrode jack W1, as well as to output W2 and battery pack B1. The circuitry and function of arc generator AG are well known in the art.

A cutting gun 60 preferably has an electrode 60E electrically connected to electrode jack W0 via a cable. Electrode 60E is substantially surrounded by a ground cap 60G, which in turn is connected to electrode jack W2 via a cable. Persons skilled in the art will recognize that the cables connected to jacks W0, W2 may be combined to avoid tangles, etc.

Gun 60 may also have fins and orifices 60F to direct airflow in a predictable pattern that will assist the plasma arc through the workpiece W. Gun 60 may also have a fan (not shown) for blowing air or gas from a tank 60GT.

Preferably, gun 60 has a handle 60H, allowing the user to ergonomically hold gun 60, and an on/off switch 60T, which could be connected via electrode jack W to battery pack B1. When the user activates switch 60T, such contact will enable battery pack B1 to transmit power. When the user deactivates switch 60T, battery pack B1 will be disabled.

As before, it is preferably that the entire plasma cutting machine 200 be storable into housings, such as the housings 101 and/or 102 of the previous embodiments. The total weight of plasma cutting machine 200, excluding cables GCC, the gun cables, clamp GC, and gun 60, is preferably between about 8 pounds to about 23 pounds.

Persons skilled in the art will recognize that a charger circuit may be disposed in housings 101 and/or 102 to charge battery pack B1.

Figure 8:
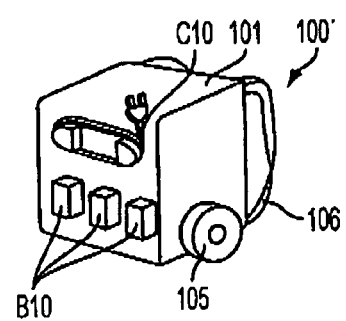
FIG. 8 is a perspective view of an alternate embodiment for a cordless welding machine.

FIGS. 7-8 illustrate another embodiment of a MIG welding machine 100', where like numerals refer to like parts. In this embodiment, the welding machine 100' may have one or more on-board chargers 150 for charging battery packs B10. Preferably, such battery packs B10 are engageable with a power tool, akin to the embodiment shown in FIG. 6. Persons skilled in the art are referred to US Published Application Nos. 2005/0073282 and 2005/0077878, which are fully incorporated herein by reference for further information on the components, operation and capabilities of battery packs B10.

The voltage of each battery pack B10 may be higher than 18 volts and is preferably between about 28 and about 36 volts.

In the embodiment of FIGS. 7-8, welding machine 100' preferably uses three battery pack B10, each battery pack B10 having a nominal voltage of about 24 to 36 volts.

Figure 7A:
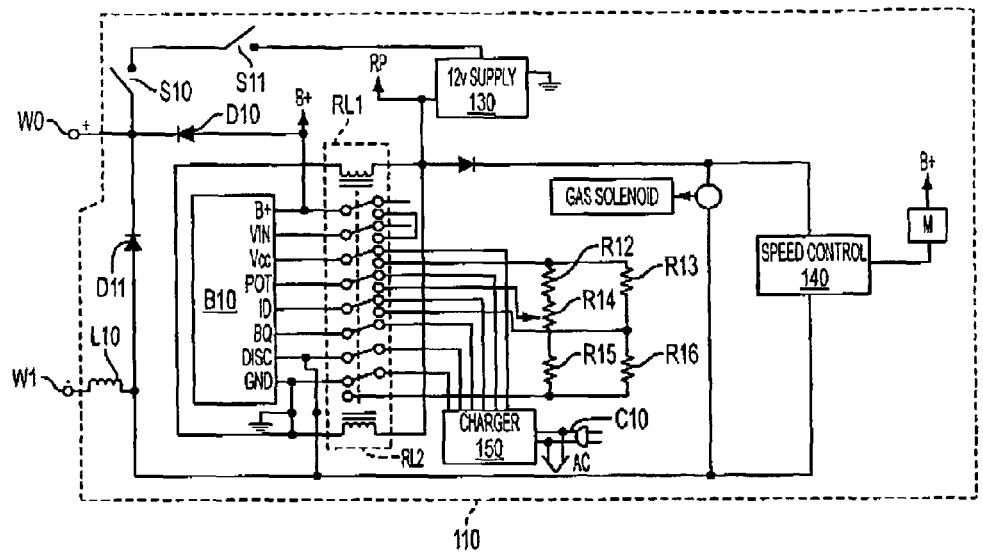
FIGS. 7A-7D are schematic diagrams for a principal battery circuit, a secondary battery circuit, a voltage supply regulator and a speed control circuit, respectively.

One battery pack B10 is connected to the primary circuit 110 shown in FIG. 7A. The remaining battery packs B10 are each connected to a secondary circuit 120 shown in FIG. 7B. Persons skilled in the art will recognize that the outputs of circuits 110 and 120 are preferably connected in parallel to electrode jacks W0, W1.

Figure 7B:
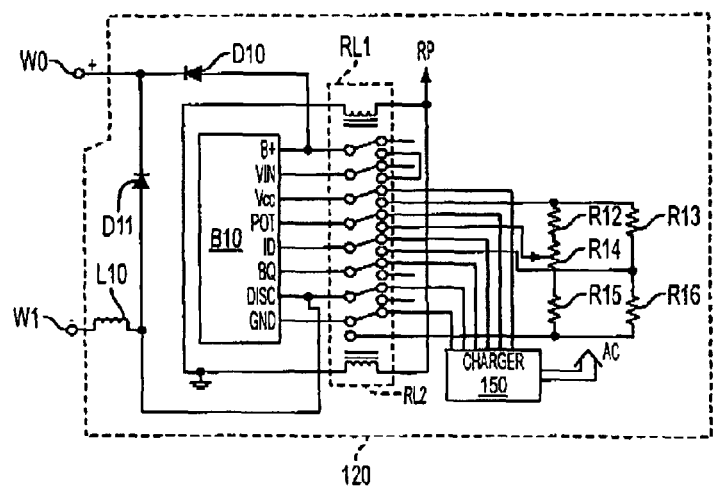

As shown in FIGS. 7A-7B, each battery pack B10 is connectable to a charger 150. Persons skilled in the art will recognize that one of the chargers 150 may be connected to an AC source via a power cord C10. The other chargers 150 can be connected in parallel to the power cord C10. In this manner, the welding machine 100' is both cordless (as it can run off battery packs B10) and AC-powered (as chargers 150 charge battery packs B10, which in turn power the welding machine 100'). Users can also remove battery packs B10 after charging for use with a power tool 2100.

Primary circuit 110 has relays RL1, RL2 to select whether the battery pack B10 receives power from charger 150, or whether battery pack B10 provides power to electrode jacks W0, W1. Persons skilled in the art will recognize that battery pack B10 will provide power to electrode jacks W0, W1, when the on/off switch S10 and a gun switch S11 (disposed, for example, in a gun 50) are both activated, activating power supply 130, which in turn activate relays RL1, RL2. When on/off switch S10 or gun switch S11 are released or moved to the OFF position, power supply 130 will be deactivated, thus deactivating relays RL1, RL2, and allowing battery pack B10 to be charged by charger 150.

Figure 7C:
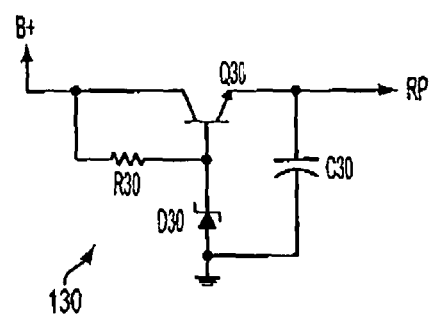
Figure 7D:
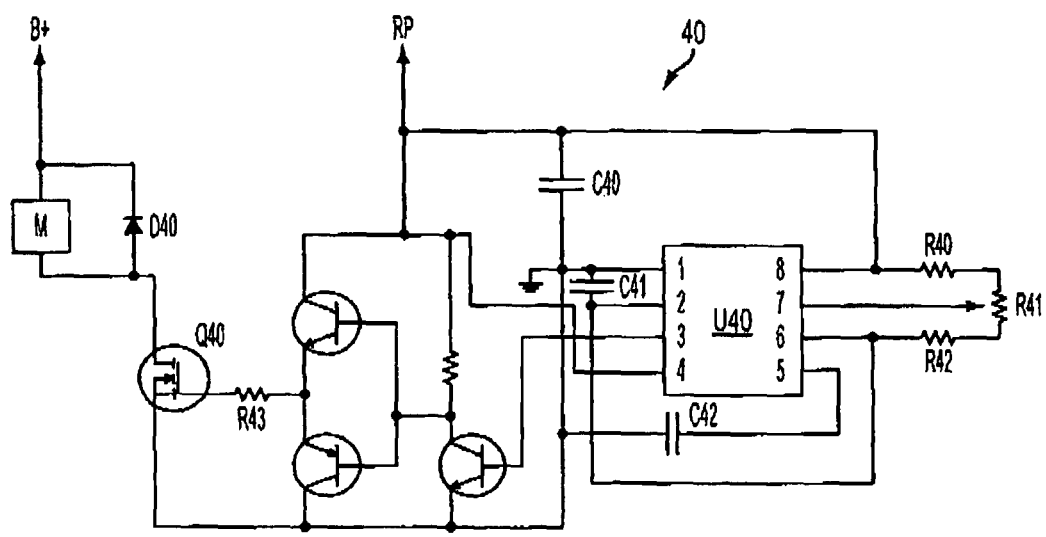

FIG. 7C is the schematic circuit for power supply 130. Basically, battery power B+ is received. Zener diode D30 limits and regulates the output regulated power RP. Preferably, the regulated power RP is about 12 volts. Persons skilled in the art will recognize that, instead of using a power supply circuit with discrete components, some of the components may be replaced with a voltage regulator integrated circuit.

This regulated power RP may be used to activate the relays RL1, RL2 in the secondary circuits 120 (shown in FIG. 7B) to select whether the battery pack B10 receives power from charger 150, or whether battery pack B10 provides power to electrode jacks W0, W1. Persons skilled in the art will recognize that battery pack B10 will provide power to electrode jacks W0, W1, when the on/off switch S10 and a gun switch S11 (disposed, for example, in a gun 50) are both activated, activating power supply 130, which in turn activate relays RL1, RL2.

Regulated power RP may also be used to power a gas solenoid used in the welding machine 100', if necessary. In addition, regulated power RP powers the speed control circuit 140 (fully shown in FIG. 7D) that controls the speed of the motor M feeding the electrode 50E through a gun 50.

Diodes D10, D11 are preferably disposed between battery pack B10 and electrode jack W0. This is to prevent a battery pack B10 from a secondary circuit 120 charging a battery pack B10 in the primary circuit 110 or another secondary circuit 120, etc.

Resistors R12, R13, R14, R15 and R16 are preferably provided to control the amount of voltage provided via electrode jacks W0, W1. Preferably all resistors R14 in primary and secondary circuits 110, 120 are potentiometers sharing a common shaft, so that when the user rotates the shaft, all resistors R14 are adjusted in the same amount.

The following list shows the values for the different components in the circuits shown in FIGS. 7A-7D:

C30 47 microfarads, 50V
C40 0.1 microfarads
C41 0.1 microfarads
C42 0.1 microfarads
D30 12V, 1 W
D40 1N4007
Q30 TIP31C TO-220
Q40 1RF1404Z
R12 10 kiloohms, 1%
R13 10 kiloohms, 1%
R14 10 kiloohms potentiometer
R15 11.3 kiloohms, 1%
R16 11.3 kiloohms, 1%
R30 100 ohms, 2 W
R40 2 kiloohms, 5%
R41 10 kiloohms potentiometer
R42 2 kiloohms, 5%
R43 100 ohms, 5%
RL1 Digi-Key Z187-ND, 37 mA
RL2 Digi-Key Z187-ND, 37 mA
U40 LM555

With such arrangement, welding machine 100' would preferably weigh about 21.5 pounds, and about 28 pounds to about 29 pounds with three battery packs B10 (without cables, spool and spool gun). The current output will be between about 92 amps and about 96 amps, at a 20% duty cycle. This provides for an output current-to-weight ratio of at least about 3.17 amps/pound.

Because of the light weight of welding machine 100', it may be preferable to provide housing 101 with straps 106, so the user can carry the welding machine 100' as a backpack. Alternatively, housing 101 may have wheels 105 so the user can easily move the welding machine 100'.

Typical heavy-duty welders draw power from the AC sources during the welding operation. Typically such welders require 15-20 amps during the welding operation. Accordingly, they are limited to the current available at the moment of welding. Furthermore, such welders require a heavy power cord and/or extension cord to handle such current.

Because welding machine 100' relies on battery packs B10 to provide the power for the welding operation and only needs AC power to charge the battery packs, the welding machine 100' draws less current than typical welders. In the present configuration, welding machine 100' draws about 5 amps to about 7 amps at 20% duty cycle continuously in order to produce the 90+ amps at 20% duty cycle.

By comparison, typical welding machines draw all the power to perform the welding operation from the AC line. Under North American standards, a typical welder that has a conversion efficiency of 85% would need to draw over 18 amps to supply 90 amps at 20 volts output. Such welder would not be usable with the 15 amp receptacle outlet found in most North American households, requiring such welder to be connected to a special receptacle. In contrast, by using batteries B10 to provide the necessary power, the welder 100' can be connected to a common 15 amp receptacle.

Furthermore, because of such lower AC current requirements, cord C10 and/or an extension cord attached to cord C10 can have a gauge rating lower than the gauge rating used in typical welders. Such gauge rating could be at least 18 AWG or 16 AWG. Persons skilled in the art will recognize that cord C10 and/or the extension can have a higher gauge rating, such as 14 AWG, 12 AWG, etc.

Persons skilled in the art will recognize that providing a cord C10 and/or extension with a gauge rating of 18 AWG or higher, the total maximum cord length (without a welding machine shutting down due to the voltage drop due to the cord resistance or without melting the cord) will be at least 100 feet. Preferably, the total maximum cord length for cords having a gauge rating of 16 AWG, 14 AWG or 12 AWG (without a welding machine shutting down due to the voltage drop due to the cord resistance or without melting the cord) being about 192 feet, about 304 feet and about 482 feet, respectively. Accordingly, by using batteries to provide the necessary power, the distance from welder to power source can be greatly increased without using large, heavy, and expensive extension cords.

Welding machine 100' has an output current of 93 amps at 20% duty cycle, and a usable peak output current of about 120 amps to about 135 amps, with an adjustable voltage of about 14 volts and about 24 volts.

Persons skilled in the v will recognize that while battery pack(s) B10 are preferably removable, the welding machine 100' may have non-removable battery cells instead that can be charged by an on-board charger circuit, such as charger 150.

Persons skilled in the art will recognize that in all embodiments discussed herein a discharge control is provided in the different battery packs. However, such discharge control can be provided external to the battery pack so that batteries without discharge control can be used to power a cordless welding machine.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:
1. A welding machine comprising:
a housing;
first and second batteries disposed in the housing and being connected in parallel, the first and second batteries being power tool batteries that are electrically connectable and physically attachable to a power tool;
a ground clamp connected to the first and second batteries; and
a welding gun including a first welding electrode connected to the first and second batteries;
the batteries providing a current output of at least 40 amps;
wherein the welding machine, excluding the ground clamp and any cables connecting to the first welding electrode in the welding gun, weighs less than 30 pounds and has a current-to-weight ratio between about 3.17 amps/pound and about 10 amps/pound.

2. The welding machine of claim 1, further comprising a charger for charging at least one of the first and second batteries.

3. The welding machine of claim 2, further comprising a cord for connecting the charger to an AC source.

4. The welding machine of claim 3, wherein the cord is at least a hundred feet long.

5. The welding machine of claim 3, wherein the cord has a gauge rating of at least 18 AWG.

6. The welding machine of claim 1, further comprising a discharge control circuit for controlling the discharge of the at least one of the first and second batteries.

7. The welding machine of claim 6, wherein the discharge control circuit is disposed within the at least one of the first and second batteries.

8. The welding machine of claim 1, further comprising a housing for supporting the first and second batteries.

9. The welding machine of claim 8, wherein the housing has wheels.

10. The welding machine of claim 8, herein the housing has at least one shoulder strap.

11. The welding machine of claim 1, wherein a first diode is disposed between the welding gun and the first battery, and a second diode is disposed between the welding gun and the second battery.

12. A welding machine comprising:
a housing;
first and second batteries disposed in the housing and being connected in parallel, the first and second batteries being power tool batteries that are electrically connectable and physically attachable to a power tool;
a ground clamp connected to the first and second batteries;
a welding gun including a first welding electrode connected to the first and second batteries;
a first diode disposed between the first welding electrode in the welding gun and the first battery; and
a second diode is disposed between the first welding electrode in the welding gun and the second battery;
wherein the welding machine, excluding the ground clamp and any cables connecting to the first welding electrode in the welding gun, weighs less than 30 pounds and has a current-to-weight ratio between about 3.17 amps/pound and about 10 amps/pound.

13. The welding machine of claim 12, further comprising a charger for charging at least one of the first and second batteries.

14. The welding machine of claim 13, further comprising a cord for connecting the charger to an AC source.

15. The welding machine of claim 14, wherein the cord is at least a hundred feet long.

16. The welding machine of claim 14, wherein the cord has a gauge rating of at least 18 AWG.

17. The welding machine of claim 12, further comprising a discharge control circuit for controlling the discharge of at least one of the first and second batteries.

18. The welding machine of claim 17, wherein the discharge control circuit is disposed within the at least one of the first and second batteries.

19. A welding machine comprising:
a housing;
first and second batteries disposed in the housing and being connected in parallel, the first and second batteries being power tool batteries that are electrically connectable and physically attachable to a power tool;
a ground clamp connected to the first and second batteries;
a welding gun including a first welding electrode connected to the first and second batteries; and
a charger for charging at least one of the first and second batteries; and
a first diode disposed between the first welding electrode of the welding gun and the first battery, and a second diode is disposed between the first welding electrode of the welding gun and the second battery,
wherein the welding machine, excluding the ground clamp and any cables connecting to the first welding electrode of the welding gun, weighs less than 30 pounds and has a current-to-weight ratio between about 3.17 amps/pound and about 10 amps/pound.

20. The welding machine of claim 19, further comprising a cord for connecting the charger to an AC source.

21. The welding machine of claim 20, wherein the cord is at least a hundred feet long.

22. The welding machine of claim 20, wherein the cord has a gauge rating of at least 18 AWG.

23. The welding machine of claim 19, further comprising a discharge control circuit for controlling the discharge of at least one of the first and second batteries.

24. The welding machine of claim 23, wherein the discharge control circuit is disposed within the at least one of the first and second batteries.

25. A welding machine comprising:
a housing;
first and second batteries disposed in the housing and being connected in parallel, the first and second batteries being power tool batteries that are electrically connectable and physically attachable to a power tool;
a ground clamp connected to the first and second batteries; and
a welding gun including a first welding electrode connected to the first and second batteries;
wherein the welding machine, excluding the ground clamp and any cables connecting to the first welding electrode of the welding gun, weighs less than 30 pounds and has a current-to-weight ratio between about 3.17 amps/pound and about 10 amps/pound.

26. The welding machine of claim 25, wherein a first diode is disposed between the first welding electrode of the welding gun and the first battery, and a second diode is disposed between the first welding electrode of the welding gun and the second battery.

27. The welding machine of claim 25, further comprising a discharge control circuit for controlling the discharge of at least one of the first and second batteries.

28. The welding machine of claim 27, wherein the discharge control circuit is disposed within the at least one of the first and second batteries.

29. The welding machine of claim 25, further comprising a charger for charging at least one of the first and second batteries.

30. The welding machine of claim 29, further comprising a cord for connecting the charger to an AC source.

31. The welding machine of claim 30, wherein the cord is at least a hundred feet long.

32. The welding machine of claim 30, wherein the cord has a gauge rating of at least 18 AWG.

33. A cordless plasma cutter comprising:
a first battery connectable and physically attachable to a separate power tool;
an arc generator circuit connected to the first battery;
a ground clamp connected to the first battery and to a workpiece;
a first electrode connected to the first battery; and
a second electrode connected to the arc generator circuit;
wherein the first and second electrodes create a cutting arc directed to the workpiece.

34. The cordless plasma cutter of claim 33, wherein the first and second electrodes are part of a gun.

* * * * *